(12) United States Patent
Edwards (10) Patent No.: US 9,447,750 B2
(45) Date of Patent: Sep. 20, 2016

(54) PROPULSION ENGINE

(75) Inventor: David A Edwards, Derby (GB)

(73) Assignee: ROLLS-ROYCE plc, London (GB)

( * ) Notice: Subject to any disclaimer, the term of this patent is extended or adjusted under 35 U.S.C. 154(b) by 1019 days.

(21) Appl. No.: 13/456,858

(22) Filed: Apr. 26, 2012

(65) Prior Publication Data

US 2012/0294717 A1 Nov. 22, 2012

(30) Foreign Application Priority Data

May 19, 2011 (GB) .................................. 1108367.2

(51) Int. Cl.
| | |
|---|---|
| *B64C 11/38* | (2006.01) |
| *B64C 11/42* | (2006.01) |
| *F02K 3/072* | (2006.01) |
| *F01D 7/02* | (2006.01) |
| *B64C 11/30* | (2006.01) |
| *B64D 27/00* | (2006.01) |

(52) U.S. Cl.
CPC ............. *F02K 3/072* (2013.01); *B64C 11/308* (2013.01); *F01D 7/02* (2013.01); *B64C 11/306* (2013.01); *B64C 11/38* (2013.01); *B64C 11/42* (2013.01); *B64D 2027/005* (2013.01); *F05D 2260/79* (2013.01); *Y02T 50/66* (2013.01); *Y02T 50/673* (2013.01)

(58) Field of Classification Search
CPC ... B64C 11/306; B64C 11/308; B64C 11/38; B64C 11/385; B64C 11/40; B64C 11/42; F01D 7/00; F02K 3/072; B64D 2027/005

USPC .... 416/156, 157 R, 157 B, 162, 164, 168 R, 416/168 A, 128–130, 147; 415/129–130
See application file for complete search history.

(56) References Cited

U.S. PATENT DOCUMENTS

| | | | | |
|---|---|---|---|---|
| 4,657,484 | A | * | 4/1987 | Wakeman et al. ............. 416/127 |
| 5,464,324 | A | * | 11/1995 | Langenberg ............. B63H 3/04 416/127 |
| 7,179,054 | B1 | * | 2/2007 | Borges ............................ 416/31 |
| 8,985,954 | B2 | * | 3/2015 | Balk et al. ................. 416/168 R |

FOREIGN PATENT DOCUMENTS

| | | |
|---|---|---|
| GB | 536265 A | 5/1941 |
| GB | 644100 A | 10/1950 |
| WO | WO 2010/136686 A2 * | 12/2010 ............. B64C 11/30 |

OTHER PUBLICATIONS

Sep. 16, 2011 British Search Report issued in British Application No. GB1108367.2.

* cited by examiner

*Primary Examiner* — Christopher Verdier
(74) *Attorney, Agent, or Firm* — Oliff PLC (57) ABSTRACT

A propulsion engine for an aircraft includes a first fan having a set of first blades and a second fan having a set of second blades. There is provided a first angular pitch adjustment mechanism coupled to the first set of blades, a second angular pitch adjustment mechanism coupled to the second set of blades and an actuation device coupled to the first angular pitch adjustment mechanism. The first and second angular pitch adjustment mechanisms are coupled together such that when the actuation device generates an output, the angular pitch of each of the first blades and each of the second blades changes.

15 Claims, 6 Drawing Sheets

PROPULSION ENGINE

The invention relates to a propulsion engine having first and second fans coupled to first and second pitch adjustment mechanisms respectively.

Figure 1:
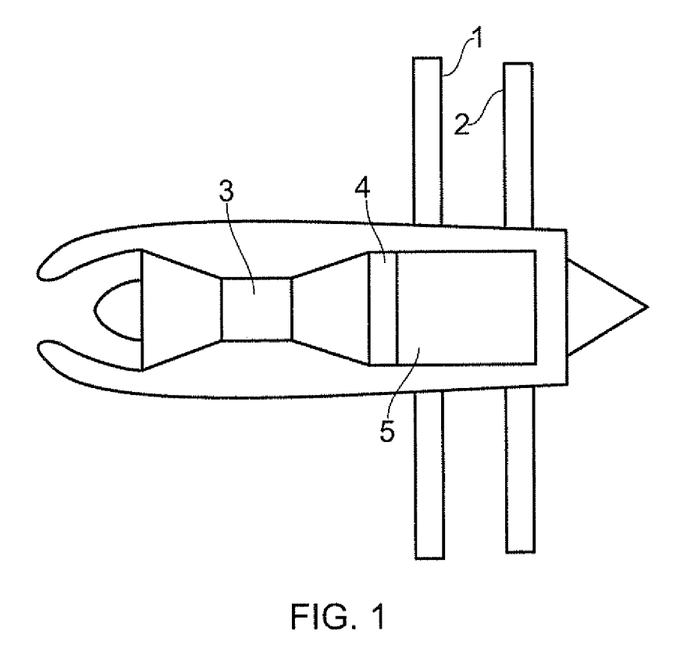
FIG. 1 schematically shows the basic engine architecture of a propulsion engine.

FIG. 1 illustrates the basic engine architecture of a contra-rotating propulsion engine. Contra-rotating propeller assemblies 1, 2 are driven by an engine core 3 supplying gas through a static structure 4 and inter-meshed free power turbines 5. The turbines 5 directly drive the propellers 1, 2 which, as indicated, are generally contra-rotating to provide propulsion for an aircraft, for example.

The angular pitch angle of the propellers 1, 2 can be changed by an appropriate mechanism in order to allow the propellers 1, 2 to operate efficiently throughout an operational flight.

Figure 2:
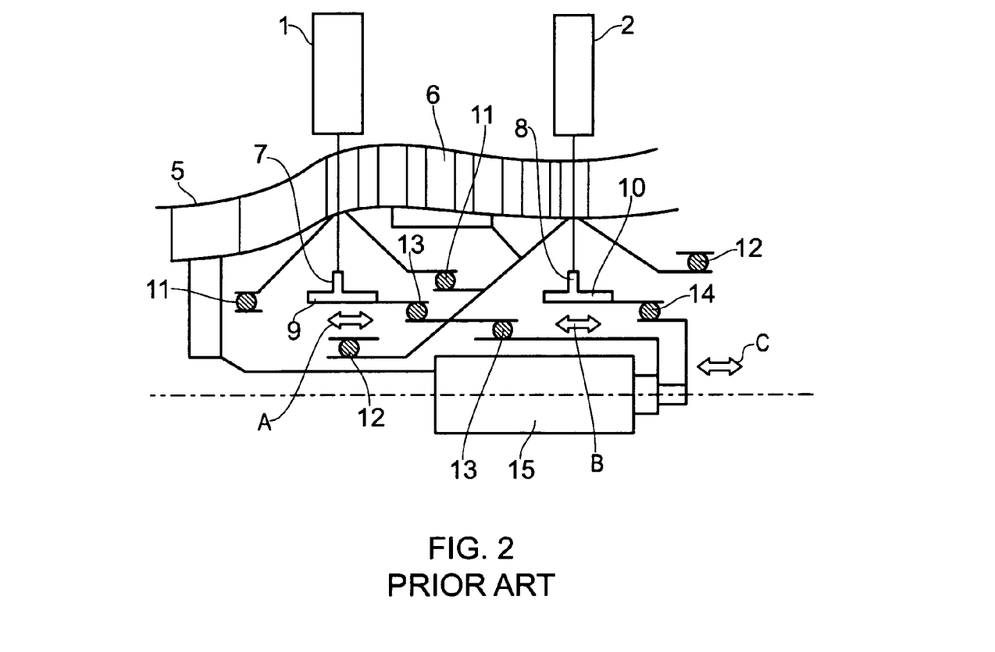
FIG. 2 schematically shows a previously considered angular pitch change mechanism.

A previously considered angular pitch adjustment mechanism comprises two concentric actuators mounted on the engine centre line which pull or push a rack which in turn drives pinions which change the angular pitch of the propellers 1, 2. There is one rack and pinion per propeller assembly 1, 2. FIG. 2 illustrates such an arrangement as a schematic half cross-section. The static section 5 incorporates low pressure turbines 6 which drive the contra-rotating propellers 1, 2. These contra-rotating propellers 1, 2 are attached to pinions 7, 8 which in turn are driven by racks 9, 10 such that the pinions 7, 8 move in the direction of arrowheads A, B. Location and support bearings 11, 12 are provided to be secured upon the turbines driving the propellers 1, 2, whilst bearings 13, 14 are provided to facilitate the pitch adjustment mechanism for the respective propellers 1, 2. It will be appreciated that in use there will be a number of propellers secured about the turbine 6 in order to rotate appropriately for thrust generation. An actuator assembly 15 is provided which has two independent actuation mechanisms that act in the axial direction C to drive the two racks 9, 10 independently. The actuator assembly 15 is concentric with the axis of the engine and comprises two concentrically mounted hydraulic pistons. Each of the two pistons must be controlled separately in order to adjust the angular pitch of the first and second contra-rotating propellers 1, 2.

Whilst this arrangement is satisfactory for some applications, there are a number of drawbacks. The normal default position is for the angular pitch of the two propellers to be the same. Therefore, the two concentric hydraulic pistons must be controlled so that the angular pitch of the first and second propellers is similar to one another. Further, there is no static structure for the rear propeller assembly and therefore co-axial hydraulic pistons are required to be mounted on the engine centre line in between the two propeller assemblies. This results in a relatively complex arrangement including a large number of bearings.

It is therefore desirable to provide a propulsion engine having a less complicated pitch adjustment mechanism.

In a broad aspect, the invention relates to an angular pitch adjustment mechanism arranged to be coupled to first and second sets of blades, and an actuation means arranged such that a single output from the actuation means causes the angular pitch of the first and second blades to change. The actuation means may be a linear actuator of a plurality of linear actuators that provide a single combined linear output. The angular pitch of the first and second blades may be arranged to change in a pre-determined ratio, for example 1:1. The angular pitch of the first and second blades may be arranged to change in opposite directions.

According to an aspect of the invention there is provided a propulsion engine for an aircraft, comprising a first fan, such as a first propeller assembly, having a set of first blades and a second fan, such as a second propeller assembly, having a set of second blades; a first angular pitch adjustment mechanism coupled to the first set of blades; a second angular pitch adjustment mechanism coupled to the second set of blades; and an actuation means coupled to the first angular pitch adjustment mechanism; wherein the first and second angular pitch adjustment mechanisms are coupled together such that when the actuation means generates an output, the angular pitch of each of the first blades and each of the second blades changes. This arrangement allows a single actuation means to vary the angular pitch of the set of first blades and the set of second blades by generating a single output. The first and second pitch adjustment mechanisms are linked and therefore the angular pitch of the set of first blades and the set of second blades are maintained in a known relationship. Accordingly, when the actuation means generates an output, the angular pitch of the first and second blades change in a pre-determined ratio. The angular pitch adjustment mechanism is therefore simplified and only requires a single actuation means. The actuation means may be a single actuator or a plurality of actuators coupled or arranged so as to generate a single combined output.

The actuation means may be a linear actuation means arranged to generate a linear output. The linear actuation means may comprise at least one hydraulic piston. The linear actuation means may comprise a plurality of linear actuators. The plurality of linear actuators may be linked, coupled or arranged so as to act commonly to generate a combined linear output. The plurality of linear actuators may be circumferentially arranged. The plurality of linear actuators may be circumferentially arranged around the centre line or axis of the engine. The actuation means may be mounted to a static part of the engine casing.

The first angular pitch adjustment mechanism may comprise a plurality of first cranks each coupled to a first blade. The second angular pitch adjustment mechanism may comprises a plurality of second cranks each coupled to a second blade. The cranks may be attached either at the radially inner end or towards the radially inner end of the blade. The first and/or second cranks may be bellcranks. The cranks may be integral with the respective blade or may be a separate component subsequently attached to the respective blade. The geometry of the first and second cranks may be chosen such that when the actuation means generates an output, the angular pitch of the first and second blades changes in a pre-determined ratio. The geometry of the first and second cranks may be substantially the same.

The first angular pitch adjustment mechanism may comprise a first unison ring that couples the first cranks together and/or a second unison ring that couples the first cranks together. The second angular pitch adjustment mechanism may comprise a third unison ring that couples the second cranks together and/or a fourth unison ring that couples the second cranks together. The use of unison rings would help to keep all of the cranks, and therefore the blades, at the same angle. Also, unison rings could be used so that not every first crank has an actuator attached to it. For example, there could be a plurality of first cranks linked by first and/or second unison rings and only alternate cranks would have an individual actuator, or thrust rod, attached to it. When the individual actuators of the actuation means generate a combined linear output, the first cranks to which the individual actuators are attached move, and the unison rings transfer this motion to the other first cranks and therefore all of the first cranks move in unison. Similarly, the alternate second cranks may be attached by a rod to a first crank and at least one unison ring may link all of the second cranks.

The first angular pitch adjustment mechanism may be arranged to rotate with the first fan. The second angular pitch adjustment mechanism may be arranged to rotate with the second fan. A first annular thrust bearing may be disposed between the linear actuation means and the first pitch adjustment mechanism. A second annular thrust bearing may be disposed between the first pitch adjustment mechanism and the second pitch adjustment mechanism. The bearings would allow relative rotation between the linear actuation means, the first pitch adjustment mechanism and the second pitch adjustment mechanism. The first fan may comprise a first annular fan hub within which the first angular pitch adjustment mechanism is located and which is arranged to rotate with the first fan and the first angular pitch adjustment mechanism.

Each first blade may extend outside of the first annular hub and each first blade may comprise a blade hub that extends through a corresponding opening in the first fan hub. This may allow the first blade to rotate about a blade hub axis with respect to the first fan hub, thereby altering the angular pitch. Similarly, the second fan may comprise a second annular fan hub within which the second angular pitch adjustment mechanism is located and which is arranged to rotate with the second fan and the second angular pitch adjustment mechanism. Each second blade may extend outside of the second annular hub and each second blade may comprise a blade hub that extends through a corresponding opening in the second fan hub. This may allow the second blade to rotate about a blade hub axis with respect to the second fan hub, thereby altering the angular pitch.

The actuation means, which may be linear, may act on the first annular thrust bearing. There may be a single actuator or there may be a plurality of actuators. A first thrust rod may couple a first annular thrust bearing to the first pitch adjustment mechanism in order to transfer linear motion from the linear actuation means to the first pitch adjustment mechanism. There may be a plurality of circumferentially arranged first thrust rods. The first pitch adjustment mechanism may comprise a plurality of first cranks and the or each first thrust rod may be connected (directly or otherwise) to a first crank of the first pitch adjustment mechanism. A first thrust rod may be coupled to every first crank or to only some of the cranks. For example, a first thrust rod may be coupled to alternate or every third first crank. The first thrust rods may be coupled to a unison ring that links the plurality of first cranks together. A second thrust rod may couple the first pitch adjustment mechanism to a second annular thrust bearing. A third thrust rod may couple the second annular thrust bearing to the second pitch adjustment mechanism. There may be a plurality of circumferentially arranged second thrust rods and/or a plurality of circumferentially arranged third thrust rods. The first pitch adjustment mechanism may comprise a plurality of first cranks and the or each second thrust rod may be connected (directly or otherwise) to a first crank of the first pitch adjustment mechanism. The second pitch adjustment mechanism may comprise a plurality of second cranks and the or each third thrust rod may be connected (directly or otherwise) to a second crank of the second pitch adjustment mechanism. A second thrust rod may be coupled to every first crank or to only some of the first cranks. For example, a second thrust rod may be coupled to alternate or every third first crank. The second thrust rods may be coupled to a unison ring that links the plurality of first cranks together. Similarly, a third thrust rod may be coupled to every second crank or to only some of the second cranks. For example, a third thrust rod may be coupled to alternate or every third second crank. The third thrust rods may be coupled to a unison ring that links the plurality of second cranks together.

The first and second pitch adjustment mechanisms may be arranged such that when the actuation means generates an output, the angular pitch of the first blades and the second blades changes in a fixed ratio. The ratio may be 1:1. The first and second pitch adjustment mechanisms may be arranged such that when the actuation means generates an output, the first and second blades rotate (about a substantially radially extending blade hub axis so as to change the angular pitch) in opposite directions. The predetermined ratio and direction may be achieved by the geometry and orientation of first and second cranks that are comprised by the first and second pitch adjustment mechanisms respectively.

The first and second fans may be unducted. The fans may be located towards the rear of the engine behind the intake. The first and second fans may be arranged to rotate about the engine axis in opposite directions.

The propulsion engine may be a propfan.

The invention also concerns an aircraft comprising at least one propulsion engine in accordance with any statement herein.

The invention may comprise any combination of the features and/or limitations referred to herein, except combinations of such features as are mutually exclusive.

Embodiments of the present invention will now be described, by way of example only, with reference to the accompanying drawings, in which.

Figure 3:
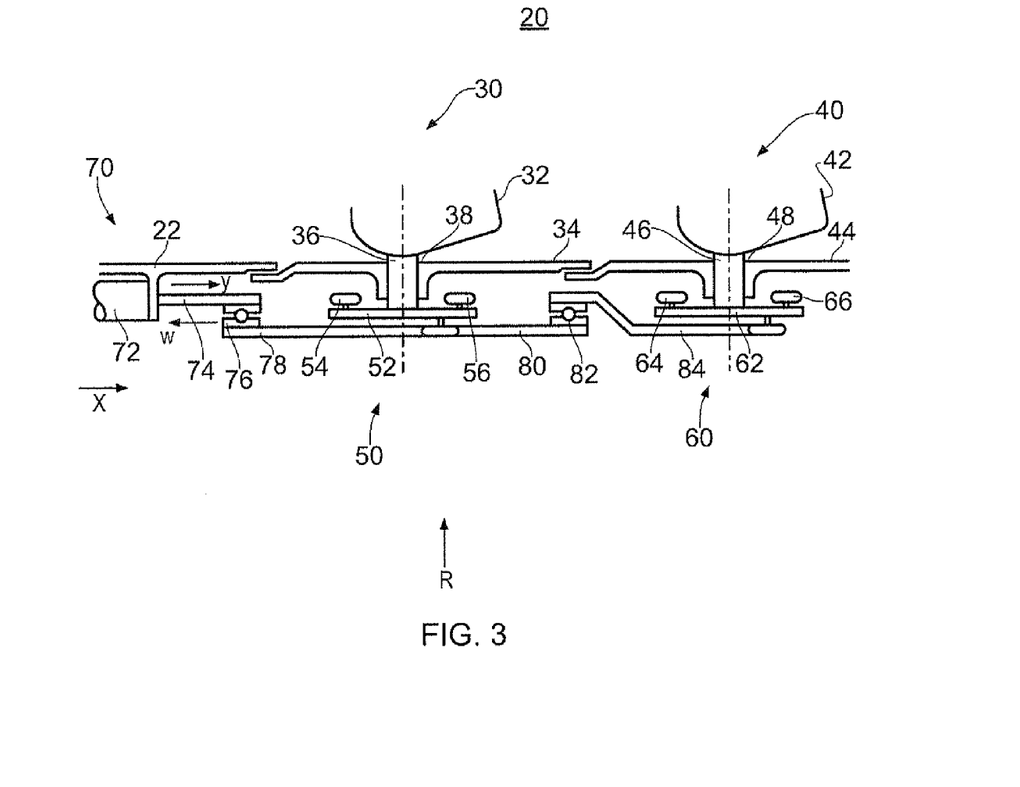
FIG. 3 schematically shows in half cross-section an embodiment of a pitch adjustment mechanism.

With reference to FIG. 3, a propulsion engine 20 comprises a static engine casing 22, a first fan in the form of a first propeller assembly 30 and a second fan in the form of a second propeller assembly 40. The first propeller assembly 30 comprises a set of first blades 32 that are circumferentially arranged and each generally extending in the radial direction. Similarly, the second propeller assembly 40 comprises a set of second blades 42 that are circumferentially arranged and each generally extending in the radial direction. The first and second propeller assemblies 30, 40 are coaxial with one another and are arranged to rotate about the engine axis. In this embodiment, the first and second propeller assemblies 30, 40 are associated with an epicyclic gear assembly (not shown) that is driven by a drive shaft of a turbine of the engine. The epicyclic gear assembly in this embodiment is arranged such that when the drive shaft rotates, the first and second propeller assemblies 30, 40 rotate in opposite directions. Therefore, the first and second propeller assemblies 30, 40 are contra-rotating. In this particular embodiment, the first and second propeller assemblies 30, 40 are unducted and are located behind the intake and therefore the propulsion engine 20 is known as a propfan.

It will be appreciated by one skilled in the art that in other embodiments the first and second propeller assemblies 30, 40 may be driven by a different arrangement and may rotate in the same direction, for example. Further, it is possible that the propeller assemblies may be located within the engine nacelle.

The propulsion engine 20 also comprises a mechanism for changing the angular pitch of each first blade 32 and each second blade 42.

Figure 4:
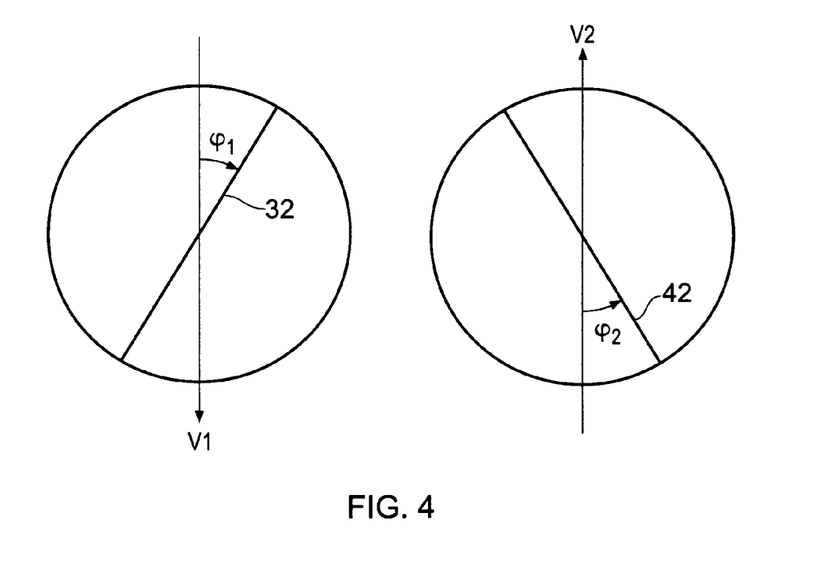
FIG. 4 schematically shows an end view of a variable pitch first blade of the first propeller assembly and an end view of a variable pitch second blade of the second propeller assembly.

Pitch angle is defined as shown in FIG. 4 wherein one of the first blades 32 of the first propeller assembly 30 is shown, and one of the second blades 42 of the second assembly 40 is shown, each viewed from its radially outer end. The first blade 32 is one of a set of blades on the first propeller assembly 30, which rotates clockwise, when viewed from the left end of the propulsion engine. Thus, the first blade 32 is travelling down the page as indicated by the arrow V1. The second blade 42 is one of a set of blades on the second propeller assembly 30, which rotates anti-clockwise, when viewed from the left end of the propulsion engine. Thus, the second blade 42 is travelling up the page as indicated by the arrow V2. Pitch angle $\phi 1$, $\phi 2$ is measured from the top dead centre, ie from the blade travel direction V1, V2. The smaller the pitch angle $\phi$, the finer the pitch; a larger pitch angle $\phi$ means a coarser pitch. When the pitch angle $\phi$ is such that air flowing across the propeller assembly creates minimal aerodynamic force on the blade 32, 42 about the engine axis, the blade 32, 42 is said to be "feathered".

Typically, the angular pitch of each of the first blades 32 is the same as the angular pitch of each of the second blades 42. However, since the first and second propeller assemblies 30, 40 rotate about the engine axis in opposite directions, when the angular pitch of the blades is adjusted, the first and second blades 32, 42 rotate about substantially radially extending axes in opposite directions. To increase the angular pitch $\phi 1$ of the first blade 32 the first blade is rotated about a substantially radially extending axis in the clockwise direction (when viewed from the radially outer end of the blade), and to increase the angular pitch $\phi 2$ of the second blade 42 the blade is rotated about a substantially radially extending axes in the anti-clockwise direction (when viewed from the radially outer end of the blade).

Referring again to FIG. 3, the mechanism for changing the angular pitch of the first blades and the second blades comprises a first angular pitch adjustment mechanism 50 and a second angular pitch adjustment mechanism 60. A first annular propeller (or fan) hub 34 surrounds the first pitch adjustment mechanism 50 and a second annular propeller (or fan) hub 44 surrounds the second pitch adjustment mechanism 60. The first and second propeller hubs 34, 44 are arranged to rotate as part of the first and second propeller assemblies 30, 40 and the first and second pitch adjustment mechanisms 50, 60 are arranged to rotate with the first and second propeller assemblies 30, 40 respectively. The first and second blades 32, 42 radially extend outside of the first and second propeller hubs 34, 44 respectively. Each first blade 32 and each second blade 42 comprises a blade hub 36, 46 that is located towards the radially inner end of the blade 32, 42 and extends through a correspondingly shaped opening 38, 48 in the propeller hub 34, 44. The radially inner end of each first blade 32 is coupled to the first pitch adjustment mechanism 50 and the radially inner end of each second blade 42 is coupled to the second pitch adjustment mechanism 60.

An actuation means 70 is coupled to the first pitch adjustment mechanism 50 which in turn is coupled to the second pitch adjustment mechanism 60. When the actuation means 70 is operated, the first pitch adjustment mechanism 50 changes the angular pitch of each of the first blades 32 by rotating each blade (with respect to the first propeller hub 34) about its substantially radially extending blade hub axis, and the second pitch adjustment mechanism 60 changes the angular pitch of each of the second blades 42 by rotating each blade (with respect to the second propeller hub 44) about its substantially radially extending blade hub axis.

Figure 5:
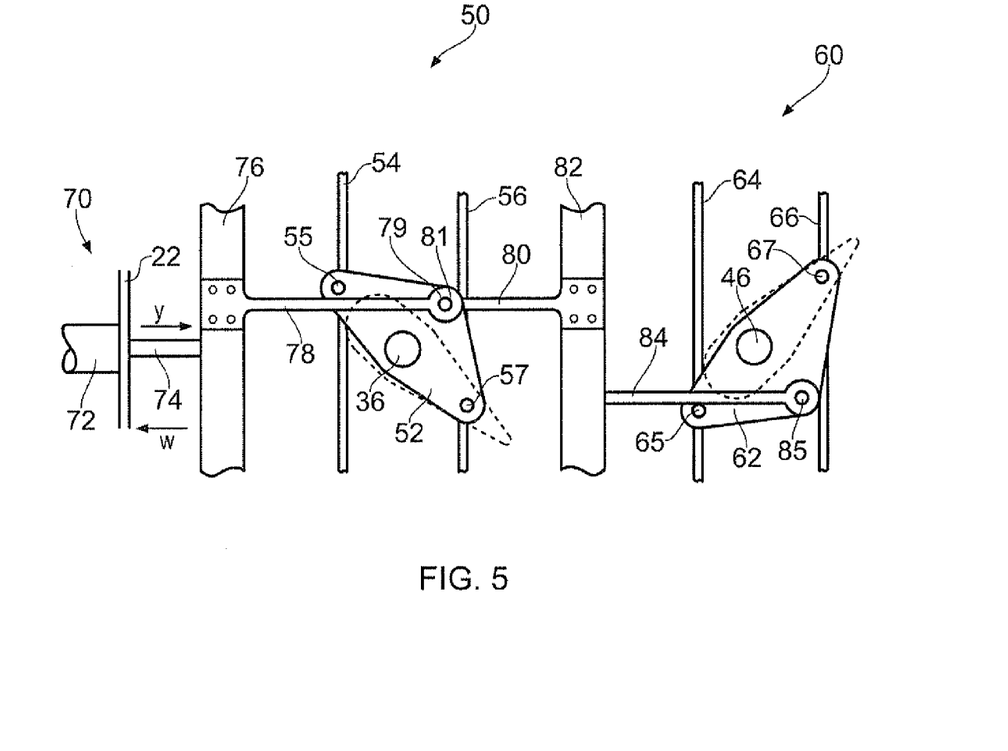
FIG. 5 schematically shows the pitch adjustment mechanism of FIG. 3 as viewed radially outwards in the direction R.

With reference to FIGS. 3 and 5, the first pitch angular adjustment mechanism 50 comprises a plurality of first bellcranks 52, the number of which corresponds to the number of first blades 32. The radially inner end of a first blade 32 is attached to a first bellcrank 52 and provides a fixed pivot axis for the first bellcrank. In this embodiment, the radially inner end of each first blade hub 36 is attached to a first bellcrank 52. However, in other embodiments the bellcrank 52 may be attached towards the end of the blade 32. The first angular pitch adjustment mechanism 50 also comprises first and second axially spaced unison rings 54, 56 that couple all of the first bellcranks 52 together. The first and second unison rings 54, 56 are essentially annular metal rings that are coaxial with the engine axis. Each first bellcrank 52 is attached to the first and second unison rings 54 by respective pivot connections 55, 57. The first and second unison rings 54, 56 link all of the first bellcranks 52 together such that they are constrained to move together. This means that when one of the first bellcranks 52 pivots about the respective blade hub axis by a certain angle, all of the first bellcranks 52 pivot about their respective blade hub axes by the same angle. Since the first blades 32 are attached to the first bellcranks 52, this ensures that the angular pitch of each first blade 32 is the same.

Similarly, the second pitch angular adjustment mechanism 60 comprises a plurality of second bellcranks 62, the number of which corresponds to the number of second blades 42. The radially inner end of a second blade 42 is attached to a second bellcrank 62 and provides a fixed pivot axis for the second bellcrank. In this embodiment, the radially inner end of each second blade hub 46 is attached to a second bellcrank 62. However, in other embodiments the bellcrank 62 may be attached towards the end of the blade 42. The second angular pitch adjustment mechanism 60 also comprises third and fourth axially spaced unison rings 64, 66 that couple all of the second bellcranks 62 together. The third and fourth unison rings 64, 66 are essentially annular metal rings that are coaxial with the engine axis. Each second bellcrank 62 is attached to the third and fourth unison rings 64 by respective pivot connections 65, 67. The third and fourth unison rings 64, 66 link all of the second bellcranks 62 together such that they are constrained to move together. This means that when one of the second bellcranks 62 pivots about the respective blade hub axis by a certain angle, all of the second bellcranks 62 pivot about their respective blade hub axes by the same angle. Since the second blades 42 are attached to the second bellcranks 62, this ensures that the angular pitch of each second blade 42 is the same.

Figure 6:
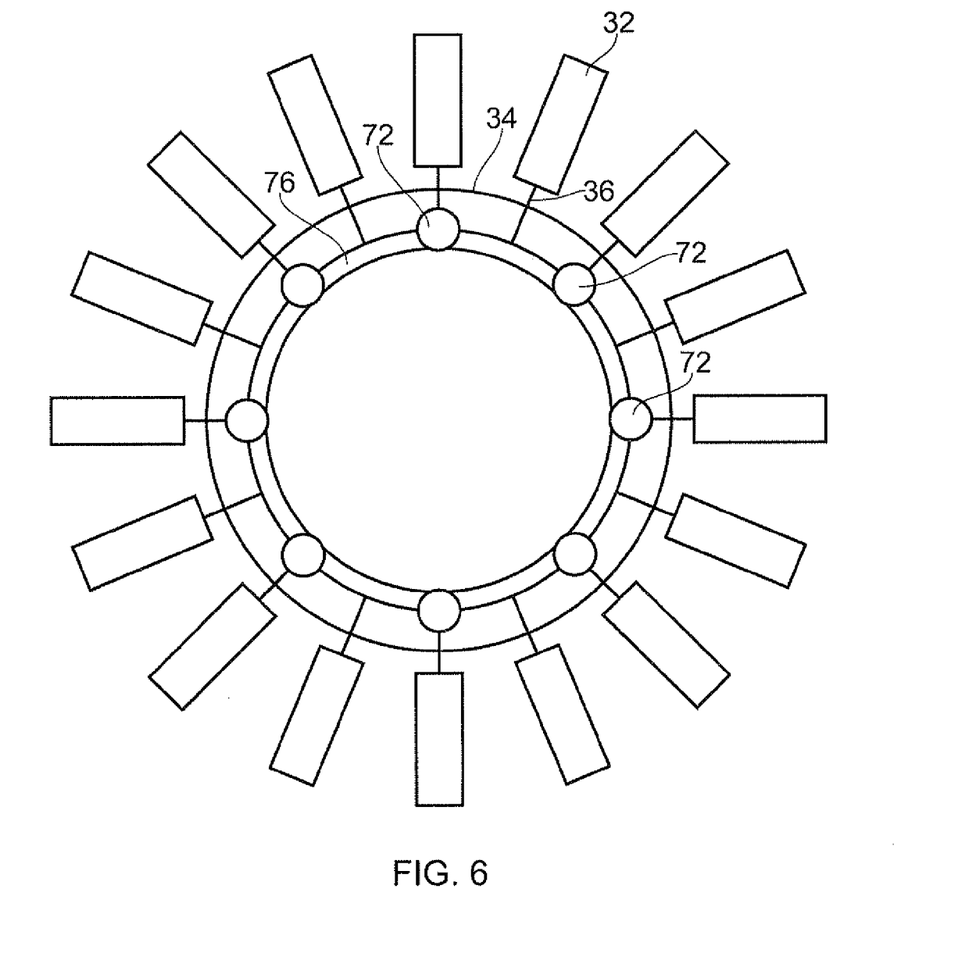
FIG. 6 schematically shows an end view of the pitch adjustment mechanism of FIG. 3 as viewed in the direction X.

As shown in FIG. 6, the actuation means 70 comprises a plurality of linear actuators 72 in the form of hydraulic pistons that are circumferentially arranged around the engine axis. Each hydraulic piston 72 is attached to a static part of the engine casing 22 and all of the pistons 72 are connected to a common controller (not shown). Each hydraulic piston 72 comprises an actuator rod (74 in FIG. 5) that is capable of moving forwards and backwards in the axial direction in order to generate a linear output. When the actuation means 70 is actuated by the controller to produce an axial linear motion, all of the hydraulic pistons 72 generate substantially the same linear output and therefore each actuator rod 74 moves by approximately the same amount. In this embodiment, the number of hydraulic pistons 72 is half the number of first bellcranks 52 (and therefore first blades 32). However, in other embodiments the number of hydraulic pistons 72 may be the same as the number of first bellcranks 52. In fact, any suitable number of circumferentially arranged linear actuators 72 may be used. In one embodiment, the actuation means 70 may comprise a single annular linear actuator. In other embodiments the actuation means 70 may be a different type of actuator such as a rotary actuator.

Referring again to FIG. 5, the actuator rods 74 are attached to a first annular thrust bearing 76 that is coaxial with the engine axis and disposed between the actuation means 70 and the first pitch adjustment mechanism 50. The first thrust bearing 76 allows the first pitch adjustment mechanism 50 to rotate with the first propeller assembly 30 with respect to the engine casing 22. A set of first thrust rods 78 are circumferentially arranged the engine axis and axially extend from the first annular thrust bearing 76. Each first thrust rod 78 is directly attached by a pivot connection 79 to a first bellcrank 52. The number of first thrust rods 78 may be the same as the number of first bellcranks 52 and therefore each first bellcrank 52 may have a first thrust rod 78 connected to it. However, in other embodiments, first thrust rods 78 may only be attached to some of the first bellcranks 52, for example, alternate or every third first bellcrank 52.

A set of axially extending second thrust rods 80 are circumferentially arranged around the engine axis and couple the first pitch adjustment mechanism 50 to a second annular thrust bearing 82 that is disposed between the first and second pitch adjustment mechanisms 50, 60. The second annular thrust bearing 82 allows the second pitch adjustment mechanism 60 to rotate, with the second propeller assembly 40, with respect to the first propeller assembly 30 and the engine casing 22. A first end of each second thrust rod 80 is directly attached by a pivot connection 81 to a first bellcrank 52 and the second end of each second thrust rod 80 is attached to the second thrust bearing 82. In this embodiment, first and second thrust rods 78, 80 are pivotally attached to a first bellcrank 52 at a common pivot point. However, in other embodiments they may be attached at different points. The number of second thrust rods 80 may be the same as the number of first bellcranks 52 and therefore each first bellcrank 52 may have a second thrust rod 80 connected to it. However, in other embodiments second thrust rods 80 may only be attached to some of the first bellcranks 52, for example, alternate or every third first bellcrank 52.

A set of third thrust rods 84 are circumferentially arranged around the engine axis and axially extend from the second annular thrust bearing 82. Each third thrust rod 84 is directly attached by a pivot connection 85 to a second bellcrank 62. The number of third thrust rods 84 may be the same as the number of second bellcranks 62 and therefore each second bellcrank 62 may have a third thrust rod 84 connected to it. However, in other embodiments third thrust rods 84 may only be attached to some of the second bellcranks 62, for example, alternate or every third second bellcrank 62.

In use, in order to change the angular pitch $\phi 1$ of each of the first blades 32 and the angular pitch $\phi 2$ of each of the second blades 42, the actuation means 70 generates a single output. In this embodiment, the first and second pitch adjustment mechanisms 50, 60 are configured such that when the actuation means 70 generates a linear output, the angular pitch of each of the first blades 32 changes by rotation about the respective blade hub axis in a first direction, and the angular pitch of each of the second blades 42 changes by rotation about the respective blade hub axis in a second opposed direction. This is important in this embodiment since the first and second propeller assemblies 30, 40 are contra-rotating.

In order to decrease the angular pitch $\phi 1$, $\phi 2$ of each of the first and second blades 32, 42, the controller (not shown) of the actuation means 70 is operated to cause all of the hydraulic pistons 72 to move the respective actuator rods 74 by a predetermined amount in the direction of arrow Y (towards the right as viewed in FIGS. 3 and 5). This causes the first thrust bearing 76 to move in the direction Y and the set of first thrust rods 78 transfers this linear motion to the first bellcranks 52. Each of the first bellcranks 52 therefore rotates about the respective blade hub axis in the anti-clockwise direction (when viewed from the radially outer side). The first and second unison rings 54, 56 ensure that all of the first bellcranks 52 rotate about the respective blade hub axis by the same angle. Since each of the first blades 32 is attached to a first bellcrank 52, each first blade 32 rotates about the respective blade hub axis in the anti-clockwise direction (when viewed from the radially outer end of the blade), thereby reducing the pitch angle $\phi 1$ of each of the first blades 32. The use of first and second unison rings 54, 56 ensures that the angular pitch $\phi 1$ of all of the first blades 32 is the same. It also means that a first thrust rod 78 does not have to be attached to every first bellcrank 52.

The linear motion transferred to the first bellcranks 52 by the first thrust rods 78 is transferred to the second thrust bearing 82 by the second thrust rods 80. This causes the second thrust bearing 82 to move in the direction Y and the set of third thrust rods 84 transfers this linear motion to the second bellcranks 62. Each of the second bellcranks 62 therefore rotates about the respective blade hub axis in the clockwise direction (when viewed from the radially outer side). The third and fourth unison rings 64, 66 ensure that all of the second bellcranks 62 rotate about the respective blade hub axis by the same angle. Since each of the second blades 42 is attached to a second bellcrank 62, each second blade 42 rotates about the respective blade hub axis in the clockwise direction (when viewed from the radially outer end of the blade), thereby reducing the pitch angle $\phi 2$ of each of the second blades 32. The use of third and fourth unison rings 64, 66 ensures that the angular pitch $\phi 2$ of all of the second blades 42 is the same. It also means that a third thrust rod 84 does not have to be attached to every second bellcrank 62.

In order to increase the angular pitch $\phi 1$, $\phi 2$ of each of the first and second blades 32, 42, the controller (not shown) is operated to cause all of the hydraulic pistons 72 to move the respective actuator rods 74 by a predetermined amount in the direction of arrow W (towards the left as viewed in FIGS. 3 and 5). This causes the first bellcranks 52 to rotate in the clockwise direction and the second bellcranks to rotate in the anti-clockwise direction, thereby increasing the angular pitch $\phi 1$, $\phi 2$ of each of the first and second blades.

Providing a single actuation means 70 that controls the angular pitch of first and second sets of blades results in an arrangement that is less complicated than the prior art arrangements. A single combined linear motion, for example, can be used to alter the pitch of the first blades 32 and the second blades 42 simultaneously. This means that it is not necessary for two independent pitch control mechanisms to be provided and controlled separately.

Further, since first and second pitch adjustment mechanisms 50, 60 are linked together, the angular pitch of the first and second sets of blades can be controlled in a known relationship. In the above described embodiment, the first and second pitch adjustment mechanisms are configured such that when the actuation means generates an output, the angular pitch of the first and second blades change by the same amount (ie the ratio is 1:1). However, the pitch adjustment mechanisms may be configured such that the angular pitch of the first blades and second blades changes in a different ratio such as 2:1, for example. Further, the pitch adjustment mechanisms may be arranged such that when the actuation means is operated, the first and second blades rotate about the respective blade hub axis is the same direction. This may be desirable if the first and second propeller assemblies 30, 40 rotate about the engine axis in the same direction.

Although it has been described that the first and second pitch adjustment mechanisms 50, 60 comprise first and second bellcranks 52, 62 respectively, in other embodiments other types of mechanisms or cranks may be used. Further, it is not essential that the pitch adjustment mechanisms comprise two unison rings. The pitch adjustment mechanisms may comprise only one unison ring each, or no unison rings. Also, the linear motion generated by the actuation means may be transferred to the first and second pitch adjustment mechanisms by any other suitable linkage. For example, thrust rods may be attached to unison rings as opposed to the cranks directly.

The invention claimed is:

1. A propulsion engine for an aircraft, comprising:
   a first fan having a set of first blades and a second fan having a set of second blades;
   a first angular pitch adjustment mechanism coupled to the set of first blades;
   a second angular pitch adjustment mechanism coupled to the set of second blades; and
   a linear actuation means coupled to the first angular pitch adjustment mechanism through a first thrust rod and a first annular thrust bearing, the linear actuation means being configured to generate a linear output, wherein:
   the linear actuation means acts on the first annular thrust bearing;
   the first thrust rod couples the first annular thrust bearing to the first pitch adjustment mechanism in order to transfer linear motion from the linear actuation means to the first pitch adjustment mechanism;
   the first angular pitch adjustment mechanism and the second angular pitch adjustment mechanism each comprise one or two unison rings to which each blade of a respective one of the set of first blades or the set of second blades is connected;
   the pitch of all blades in the respective one of the set of first blades and the set of second blades is adjustable by rotation of the one or two unison rings;
   the first angular pitch adjustment mechanism and the second angular pitch adjustment mechanism are coupled together through a set of axially extending thrust rods and a second annular thrust bearing, such that when the linear actuation means generates an output to the first angular pitch adjustment mechanism through the first thrust rod and the first annular thrust bearing, the first angular pitch adjustment mechanism is caused to adjust an angular pitch of each blade in the set of first blades, and through the transfer of linear motion through the set of axially extending thrust rods and the second annular thrust bearing coupling the first angular pitch adjustment mechanism to the second angular pitch adjustment mechanism, simultaneously the second angular pitch adjustment mechanism is caused to adjust an angular pitch of each blade of the set of second blades;
   the set of axially extending thrust rods comprises a second thrust rod and a third thrust rod;
   the second thrust rod couples the first pitch adjustment mechanism to the second annular thrust bearing;
   the third thrust rod couples the second annular thrust bearing to the second pitch adjustment mechanism;
   the second thrust rod is connected to a first crank of the first pitch adjustment mechanism; and
   the third thrust rod is connected to a second crank of the second pitch adjustment mechanism.

2. The propulsion engine according to claim 1, wherein the linear actuation means comprises at least one hydraulic piston.

3. The propulsion engine according to claim 1, wherein the linear actuation means comprises a plurality of linear actuators.

4. The propulsion engine according to claim 3, wherein the plurality of linear actuators are circumferentially arranged.

5. The propulsion engine according to claim 1, wherein the propulsion engine has an engine casing that includes a static part, and the linear actuation means is mounted to the static part of the engine casing.

6. The propulsion engine according to claim 1, wherein at least one of:
   the first angular pitch adjustment mechanism comprises a plurality of first cranks each coupled to a radially inner end of a first blade in the set of first blades; and
   the second angular pitch adjustment mechanism comprises a plurality of second cranks each coupled to a radially inner end of a second blade in the set of second blades.

7. The propulsion engine according to claim 6, wherein the one or two unison rings of the first angular pitch adjustment mechanism comprise at least one of: (i) a first unison ring that couples the first cranks together; and (ii) a second unison ring that couples the first cranks together.

8. The propulsion engine according to claim 6, wherein the one or two unison rings of the second angular pitch adjustment mechanism comprise at least one of: (i) a third unison ring that couples the second cranks together; and (ii) a fourth unison ring that couples the second cranks together.

9. The propulsion engine according to claim 6, wherein the first thrust rod is connected to a first crank of the first pitch adjustment mechanism.

10. The propulsion engine according to claim 1, wherein the first angular pitch adjustment mechanism is arranged to rotate with the first fan; and
    the second angular pitch adjustment mechanism is arranged to rotate with the second fan.

11. The propulsion engine according to claim 10, wherein there is a plurality of circumferentially arranged first thrust rods.

12. The propulsion engine according to claim 1, wherein the propulsion engine includes at least one of the following: (i) a plurality of circumferentially arranged second thrust rods; and (ii) a plurality of circumferentially arranged third thrust rods.

13. The propulsion engine according to claim 1, wherein the first pitch adjustment mechanism and the second pitch adjustment mechanism are arranged such that when the actuation means generates an output, the angular pitch of the set of first blades and the angular pitch of the set of second blades change in a fixed ratio.

14. The propulsion engine according to claim 13, wherein the ratio is 1:1.

15. The propulsion engine according to claim 13, wherein the first angular pitch adjustment mechanism and the second angular pitch adjustment mechanism are arranged such that when the actuation means generates an output, the set of first blades and the set of second blades rotate in opposite directions.

* * * * *